US007039917B2

(12) United States Patent
Lister et al.

(10) Patent No.: US 7,039,917 B2
(45) Date of Patent: May 2, 2006

(54) METHOD AND SYSTEM FOR EXECUTING TOOLS IN A SERVICE CONTROL MANAGER MODULE

(75) Inventors: Terence E. Lister, Fort Collins, CO (US); Humberto A Sanchez, II, Ft Collins, CO (US); Douglas P. Drees, Fort Collins, CO (US); Jeffrey R. Finz, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 696 days.

(21) Appl. No.: 09/813,562

(22) Filed: Mar. 20, 2001

(65) Prior Publication Data

US 2002/0178297 A1    Nov. 28, 2002

(51) Int. Cl.
*G06F 9/46* (2006.01)
(52) U.S. Cl. ........................ 718/107; 709/220; 709/221

(58) Field of Classification Search ................ 718/107; 455/422; 709/105, 220–221
See application file for complete search history.

(56) References Cited

U.S. PATENT DOCUMENTS

| | | | | |
|---|---|---|---|---|
| 5,175,800 A | * | 12/1992 | Galis et al. ................... 706/45 |
| 5,455,953 A | * | 10/1995 | Russell ....................... 710/266 |
| 5,809,415 A | * | 9/1998 | Rossmann .............. 455/422.1 |
| 6,141,665 A | * | 10/2000 | Hara et al. .................. 715/500 |
| 6,148,323 A | * | 11/2000 | Whitner et al. ............. 718/105 |
| 6,412,008 B1 | * | 6/2002 | Fields et al. ................ 709/228 |

* cited by examiner

*Primary Examiner*—Meng-Al T. An
*Assistant Examiner*—Camquy Truong (57) ABSTRACT

A service control manager (SCM) tool execution mechanism enables SCM users to execute SCM tools across a set of defined distributed nodes (systems). It provides a secure mechanism, referred to a distributed task facility (DTF), to integrate different operations and execute the operations across the set of distributed nodes.

20 Claims, 4 Drawing Sheets

METHOD AND SYSTEM FOR EXECUTING TOOLS IN A SERVICE CONTROL MANAGER MODULE

TECHNICAL FIELD

The present invention relates to system administration management, and, in particular, to service control manager modules.

BACKGROUND

Computer systems are increasingly becoming commonplace in homes and businesses throughout the world. As the number of computer systems increases, more and more computer systems are becoming interconnected via networks. These networks include local area networks (LANs). LANs also frequently have an interface to other networks, such as the Internet, and this interface needs to be monitored and controlled by network management on the LAN.

One concern encountered with networks is referred to as network management. Network management refers to monitoring and controlling of the network devices and includes the ability for an individual, typically referred to as an administrative user, to be able to access, monitor, and control the devices that are part of the network, or access, monitor, and control the devices that are part of the network coupled to other computer systems. Such access, monitoring, and control often include the ability to check the operating status of devices, receive error information for devices, change configuration values, and perform other management functions. As the size of networks increases, so too does the need for network management.

The operating system of most computers provides an administration tool or a system administration manager for invoking and performing system management tasks. The hardware of a computer system, the various facilities included within the operating system, such as the file system facility, the print spooling facility, and the networking facility, as well as the operating system itself must all be managed. This means that computer systems require some involvement by a human user or a manager of the computer system for such operations as specifying certain configuration parameters, monitoring ongoing activity, or troubleshooting some problem that has arisen. These management or administration tasks can be performed manually in many operating systems via direct manipulation of configuration files or direct invocation of specific administration utility programs. But in large operating systems involving distributed systems, a more efficient method for managing and monitoring tasks may be needed, especially in the context of tool execution.

SUMMARY

A service control manager (SCM) tool execution mechanism may enable SCM users to execute the SCM tools across a set of defined distributed nodes (systems) by providing a secure mechanism, referred to as a distributed task facility (DTF), to integrate different operations, such as commands or scripts, and execute the operations across a set of distributed nodes.

The SCM tool execution method may include receiving a request, which includes task information, from a user through a client to run a tool on one or more nodes, retrieving tool definition, node definition and user definition from a domain manager, and validating the task information received from the user. A runnable tool may be created based on the task information and the tool definition, and the SCM module may check user authorization to run the tool on all of the nodes requested, i.e., whether the user is assigned the roles associated with the tool on all of the nodes. The client may next pass the runnable tool to a DTF, which may then issue a task identifier based on the runnable tool, and pass the runnable tool to agents associated with the nodes to execute the tool. Finally, the DTF may collect task results or failure reports from the agents, and return the task results to the client and then to the user.

DESCRIPTION OF THE DRAWINGS

The detailed description refers to the following drawings, in which like numbers refer to like elements, and in which.

DETAILED DESCRIPTION

A service control manager (SCM) module multiplies system administration effectiveness by distributing the effects of existing tools efficiently across managed servers. The phrase "service control manager" is intended as a label only, and different labels can be used to describe modules or other entities having the same or similar functions.

In the SCM domain, the managed servers (systems) are referred to as "managed nodes" or simply as "nodes". SCM node groups are collections of nodes in the SCM module. They may have overlapping memberships, such that a single node may be a member of more than one group. The grouping mechanism may allow flexible partitioning of the SCM module so that users may use it to reflect the way nodes are already grouped in their environment.

Figure 1:
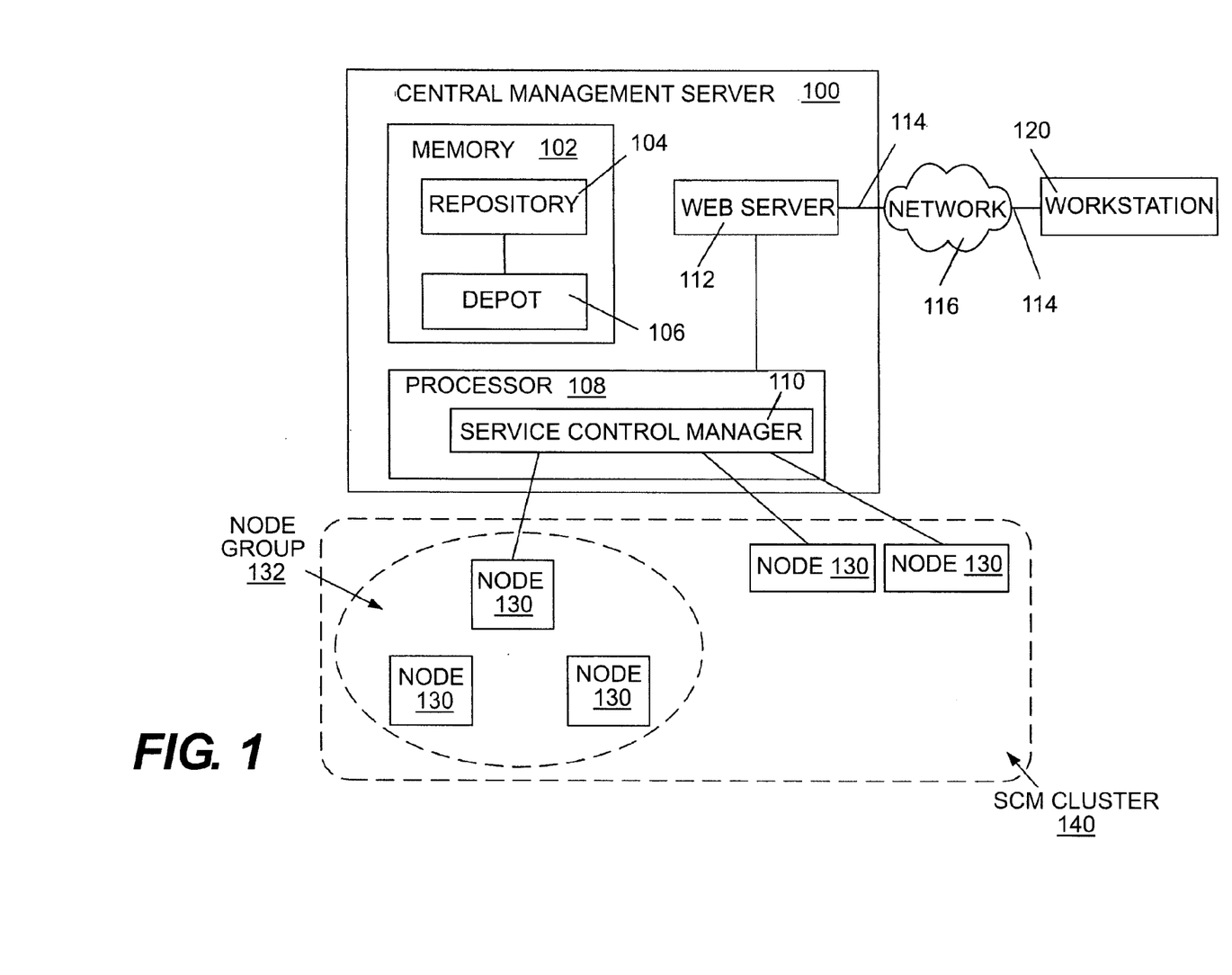
FIG. 1 illustrates a computer network system with which the present invention may be used.

FIG. 1 illustrates a computer network system with which the present invention may be used. The network system includes an SCM 110 running on a Central Management Server (CMS) 100 and one or more nodes 130 or node groups 132 managed by the SCM 110. The one or more nodes 130 and node groups 132 make up an SCM cluster 140. The CMS 100 can be implemented with, for exampl, an HP-UX11.xserver running the SCM 110 software. The CMS 100 includes a memory 102, a secondary storage device (not shown), a processor 108, an input device (not shown), a display device (not shown), and an output device (not shown). The memory 102 may include computer readable media, RAM or similar types of memory, and it may store one or more applications for execution by processor 108, including the SCM 110 software. The secondary storage device may include computer readable media, a hard disk drive, floppy disk drive, CD-ROM drive, or other types of non-volatile data storage. The processor 108 executes the SCM software and other application(s), which are stored in memory or secondary storage, or received from the Internet or other network 116. The input device may include any device for entering data into the CMS 100, such as a keyboard, key pad, cursor-control device, touch-screen (possibly with a stylus), or microphone. The display device may include any type of device for presenting a visual image, such as, for example, a computer monitor, flat-screen display, or display panel. The output device may include any type of device for presenting data in hard copy format, such as a printer, and other types of output devices include speakers or any device for providing data in audio form. The CMS 100 can possibly include multiple input devices, output devices, and display devices.

The CMS 100 itself may be required to be a managed node, so that multi-system aware (MSA) (described later) tools may be invoked on the CMS. All other nodes 130 may need to be explicitly added to the SCM cluster 140.

Generally, the SCM 110 supports managing a single SCM cluster 140 from a single CMS 100. All tasks performed on the SCM cluster 140 are initiated on the CMS 100 either directly or remotely, for example, by reaching the CMS 100 via a web connection 114. Therefore, the workstation 120 at which a user sits only needs a web connection 114 over a network 116, such as the Internet or other type of computer network, to the CMS 100 in order to perform tasks on the SCM cluster 140. The CMS 100 preferably also includes a centralized data repository 104 for the SCM cluster 140, a web server 112 that allows web access to the SCM 110 and a depot 106 that includes products used in the configuring of nodes 130. A user interface may only run on the CMS 100, and no other node 130 in the SCM module may execute remote tasks, access the repository 104, or any other SCM operations.

Although the CMS 100 is depicted with various components, one skilled in the art will appreciate that this server can contain additional or different components. In addition, although aspects of an implementation consistent with the present invention are described as being stored in memory, one skilled in the art will appreciated that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the CMS 100 to perform a particular method.

A central part of the SCM module 110 is the ability to execute various management commands or applications on the one or more nodes simultaneously. The commands or applications may need to be encapsulated with an SCM tool, which is typically used to copy files and/or execute commands on the target nodes 130. The SCM tool may run simple commands such as bdf(1) or mount (1M), launch single system interactive applications such as System Administration Manager (SAM) or Glance, launch multi-system aware applications such as Ignite/UX or Software Distributor (SD), or perform other functions. The tool may be defined using either an SCM tool definition language through command line interface (CLI) or an SCM-provided graphical user interface (GUI).

There are two general types of tools: single-system aware (SSA) tools and multi-system aware (MSA) tools. SSA tools may run on a node 130 and may only affect the operation of that node 130. To run SSA tools on multiple target nodes 130, the SCM module 110 may execute the tools on each target node 130. In addition to executing commands or launching applications, SSA tools may copy files from the CMS 100 to the target nodes 130. Files may only be copied from the CMS 100 to the managed nodes 130 in this exemplary embodiment, not from the nodes 130 back to the CMS 100.

MSA tools may run on a single node 130 but may be able to operate on multiple other nodes 130. MSA tools are applications that execute on a single node but can detect and contact other nodes to accomplish their work and this contact is out of the control of the SCM module 110. This type of application may need to have a list of nodes 130 passed as an argument at runtime. A node 130 where the application will execute may need to be specified at tool creation time, not at runtime. The target nodes 130 selected by the user may be passed to an MSA tool via a target environment variable that contains a target node list for the MSA tools. MSA tools may not copy files to either the manager node 100 or to the target nodes 130 in this exemplary embodiment. Therefore, an execution command string may be required for MSA tools.

An SCM user may be a user that is known to the SCM module 110 and has some privileges and/or management roles. An SCM role, which is an expression of intent and a collection of tools for accomplishing that intent, typically defines what the user is able to do on the associated nodes 130 or node groups 132, e.g., whether a user may run a tool on a node 130. Typically, in order to start the SCM module 110 or execute any SCM tools, the user may need to be added to the SCM module 110 and authorized either via the GUI or the command line interface (CLI). All SCM module 110 operations may be authorized based on the user's SCM authorization configuration, and/or whether or not the user has been granted SCM trusted user privilege.

The SCM user may, depending upon the roles assigned, manage systems via the SCM module 110. In addition, the user may examine the SCM module log, and scan the group and role configurations. When the SCM user runs a tool, the result maybe an SCM task. The SCM module 110 typically assigns a task identifier for every task after it has been defined and before it is run on any target nodes 130. This identifier may be used to track the task and to look up information later about the task in an SCM central log.

An SCM trusted user is an SCM user responsible for the configuration and general administration of the SCM module 110. The trusted user is typically a manager or a supervisor of a group of administrators whom a company trusts, or other trusted individual. Entrusted with the highest authority, the trusted user may do any authorization that is possible, including authorizing himself to execute any system management task with any of the nodes (machines) managed by the SCM module 110. The capabilities of the trusted user include, for example, one or more of the following: creating or modifying a user's security profile; adding, modifying or deleting a node or node group; tool modification; and tool authorization. The granting of these privileges implies a trust that the user is responsible for configuring and maintaining the overall structure of the SCM module 110.

An SCM authorization model supports the notion of assigning to users the ability to run a set of tools on a set of nodes. An authorization object is an association that links a user to a role on either a node or a node group. Each role may have one or more tools and each tool may belong to one or more roles. When users are given the authority to perform some limited set of functionality on one or more nodes, the authorization is done based upon roles and not on tools. The role allows the sum total of functionality represented by all the tools to be divided into logical sets that correspond to the responsibilities that would be given to the various administrators. Accordingly, there are different roles that may be configured and assigned with authorization. For example, a backup administrator with a "backup" role may contain tools that perform backups, manage scheduled backups, view backup status, and other backup functions. On the other hand, a database administrator with a "database" role may have a different set of tools. When a user attempts to run a tool on anode, the user may need to be checked to determine if the user is authorized to fulfill a certain role on the node and if that role contains the tool. Once a user is assigned a role, the user may be given access to any newly created tools that are later added to the role. In the example given above, the backup administrator may be assigned the "backup" role for a group of systems that run a specific application. When new backup tools are created and added to the "backup" role, the backup administrator may immediately be given access to the new tools on the systems.

Figure 2:
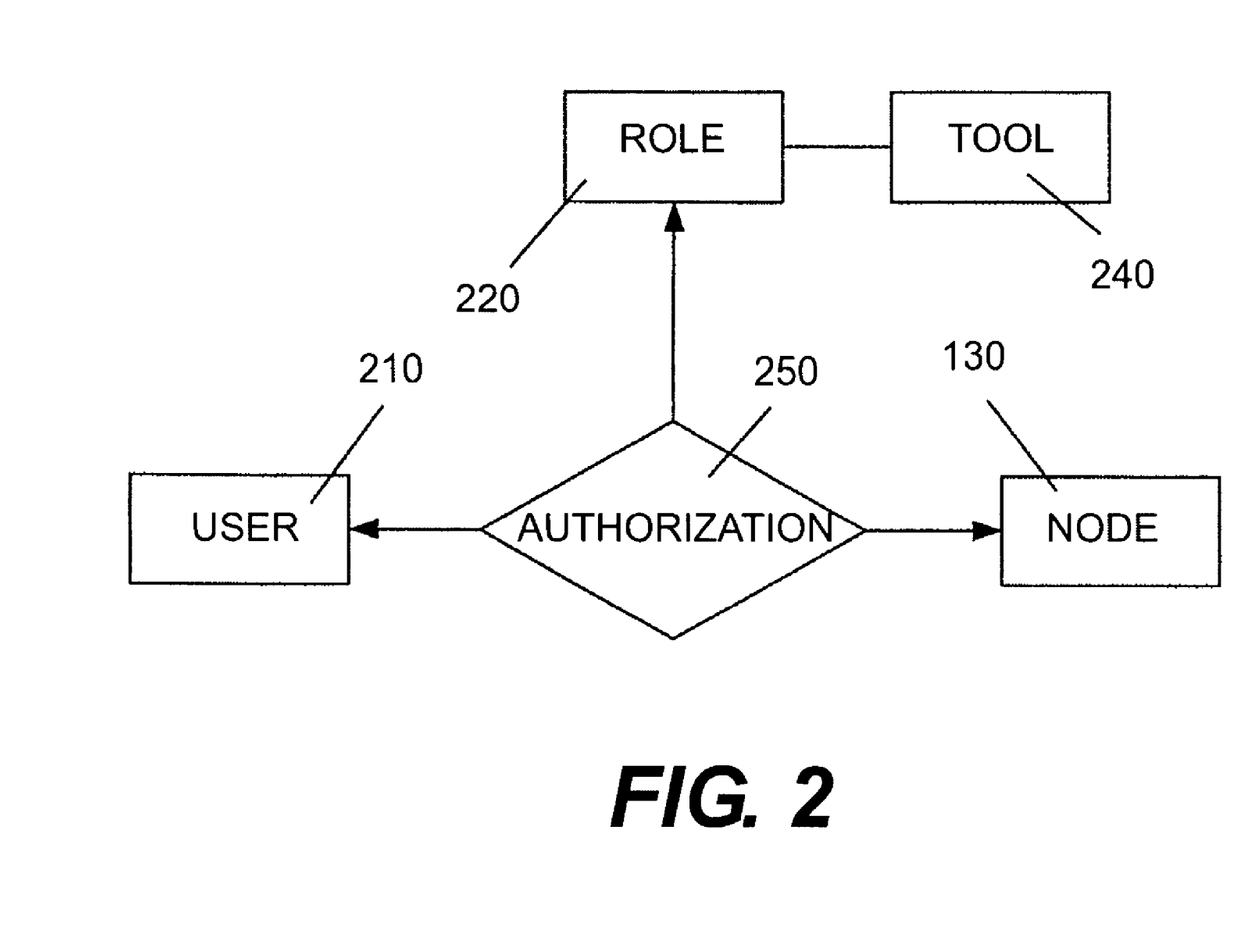
FIG. 2 illustrates the relationships between the user, role, node, tool and authorization objects.

FIG. 2 illustrates the relationships between the user 210, role 220, node 130, tool 240, and authorization 250 objects. User objects 210 represent users 210, role objects 220 represent roles 220, node objects 130 represent nodes 130, tool objects 240 represent tools 240, and authorization objects 250 represent authorizations 250. However, for purposes of this application, these terms are used interchangeably. Each authorization object 250 links a single user object 210 to a single role object 220 and to a single node object 130 (or anode group object 132). Each role object 220 may correspond to one or more tool objects 240, and each tool object 240 may correspond to one or more role objects 220. Each user object 210 may be assigned multiple authorizations 250, as may each role object 220 and each node object 130. For example, Role 1 may contain Tools 1-N, and User 1 may 11 be assigned Roles 1-M by the authorization model on Node 1. Consequently, User 1 may run Tools 1-N on Node 1, based upon the role assigned, Role 1.

Table 1 illustrates an example of a data structure for assigning tools 240 to different roles 220. Each tool 240 may correspond to a single command or application, but a single command may correspond to more than one tool 240 if there are other differences in how the tool 240 runs the command. Table 2 illustrates an example of a data structure for assigning the roles 220 to different users 210 on different nodes 130.

TABLE 1

| Roles | Tools |
|---|---|
| Role 1 | Tools 1-N |
| ... | ... |
| Role n | Tools 1-Nn |

TABLE 2

| Users | Assigned Roles | Corresponding Nodes |
|---|---|---|
| User 1 | Roles 1 | Nodes 1-N |
| ... | ... | ... |
| User n | Roles M | Nodes 1-N |

Although FIG. 2 shows a node authorization, a similar structure exists for a node group 132 authorization. The SCM authorization model may be deployed by using node group 132 authorizations more often than node 130 authorizations. This model makes adding new nodes simpler because by adding a node 130 to an existing group 132, any authorizations associated with the group 132 may be inherited at run-time by the node 130.

The authorization model for determining if a user may execute a tool 240 on a set of nodes 130 may be defined by an "all or none" model. Therefore, the user 210 must have a valid authentication association for each target node 130 to execute the tool 240. If authorization does not exist for even one of the nodes 130, the tool execution fails.

The SCM module 110 may also include security features to secure transactions that transmit across the network. All network transactions may be digitally signed using a public or private key pair. The recipient of network transmissions may be assured of who the transmission came from and that the data was not altered in the transmission. A hostile party on the network may be able to view the transactions, but may not counterfeit or alter them.

Figure 3:
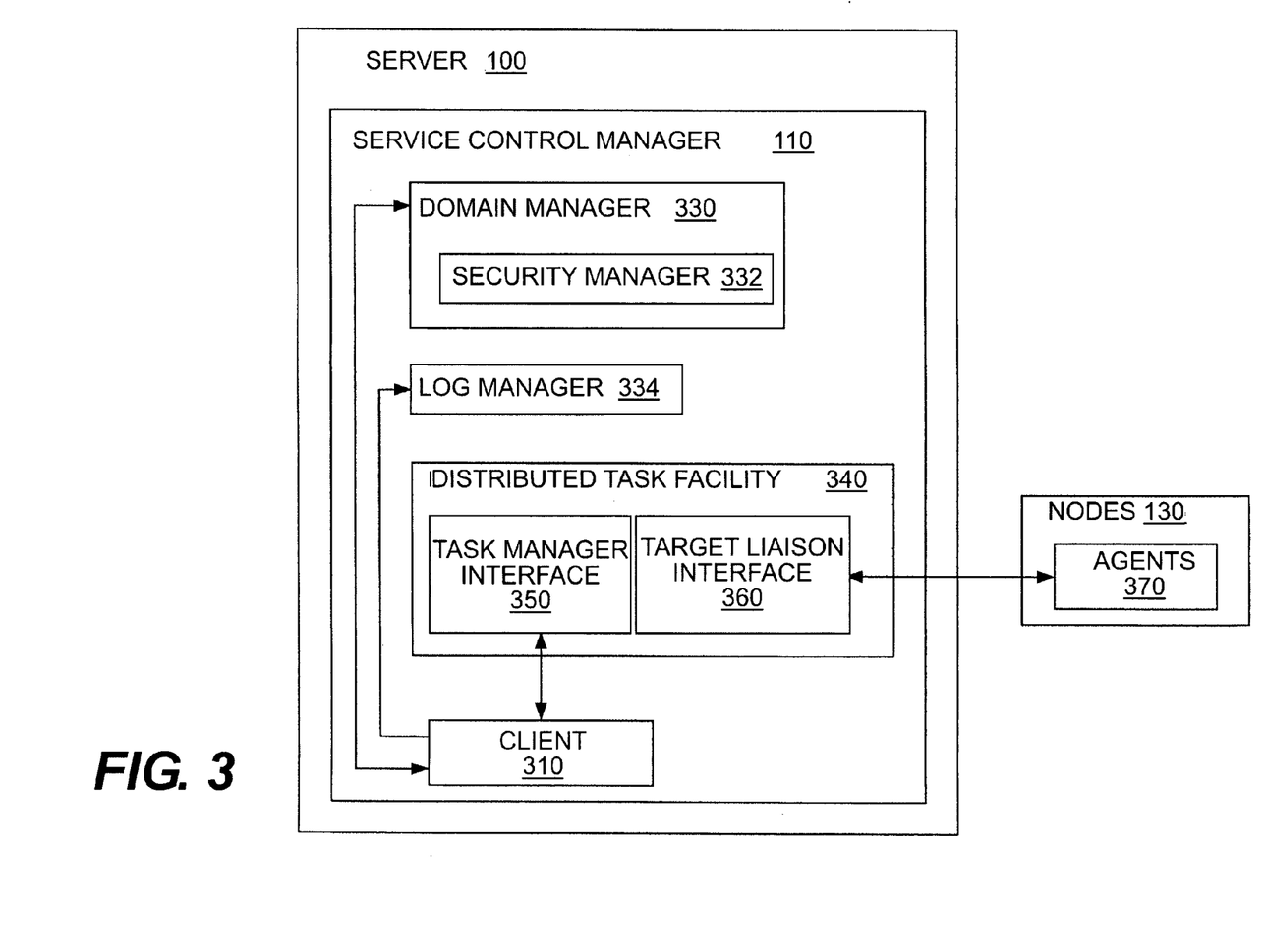
FIG. 3 illustrates the relationships between clients, a DTF and agents running on the nodes.

Referring to FIG. 3, the five separate processes involved in the tool execution may include a client process, a domain manager process, a log manager process, a DTF process and an agent process. Tool execution may start with a request to run a tool on one or more nodes 130 from a user 210 through a client 310. The client 310 is a program that interacts with the user 210 and displays information on the computer systems that reside on the nodes 130. There are two types of client 310: graphical user interface (GUI) client may be named "scmgr", and command line interface (CLI) client for executing tasks may be named "mxexec". Examples will be provided with respect to the CLI client only. A GUI client may function in a similar fashion. The client 310 may first contact the a domain manager 330 to look up user, node, and tool information and check user authorization, then log the progress with a log manager 334. The domain manager 330 is the "brain" of SCM module 110 and may be connected to the repository 104 for storage of the definitions of all the objects. The log manager 334 may manage a log file and take log requests from the clients 310 and write the requests to the SCM log file (described in detail later). Then, the client 310 may contact a DTF 340 to pass on the task to be executed. The DTF 340 may execute tasks by passing the task definitions and information to agents 370 running on the managed nodes 130. The DTF 340 is the "heart" of all task execution activity in that all of the execution steps must go through the DTF 340. The DTF 340 typically obtains an authorized runnable tool from the clients 310, distributes the tool execution across multiple nodes 130, and returns execution results to the clients 310 and to the user 210. The final process, the agent process, typically involves running the commands on the managed nodes 130. The DTF 340 may provide task manager interfaces 350 that may be called by the clients 310 to perform a task, to cancel or kill a task, or to monitor task status. The DTF 340 may also provide target liaison interfaces 360 that may be used by the agents 370 to communicate with the DTF 340 in order to process assigned tasks.

To start a task on the managed nodes 130, the DTF 340 may package up the task in a task description object, create target liaison objects 360 to track the target nodes 130, and pass them both to the agents 370 on the target nodes 130. The task description object may include task information received from the user, such as the name of the tool to be run, the location of the tool, the nodes on which to run the tool, and required arguments of the tool, if any. The task description object maybe serializable, so it may be shipped over the remote call in its entirety. But the target liaison 360 is typically a remote object and so only a remote reference to it may be shipped over with the remote call.

An important part of the task description is the task identifier described above, which may be a unique string value. It may be based upon a 32-bit integer value that will not repeat in over 60 years assuming one new task is created each second.

Figure 4:
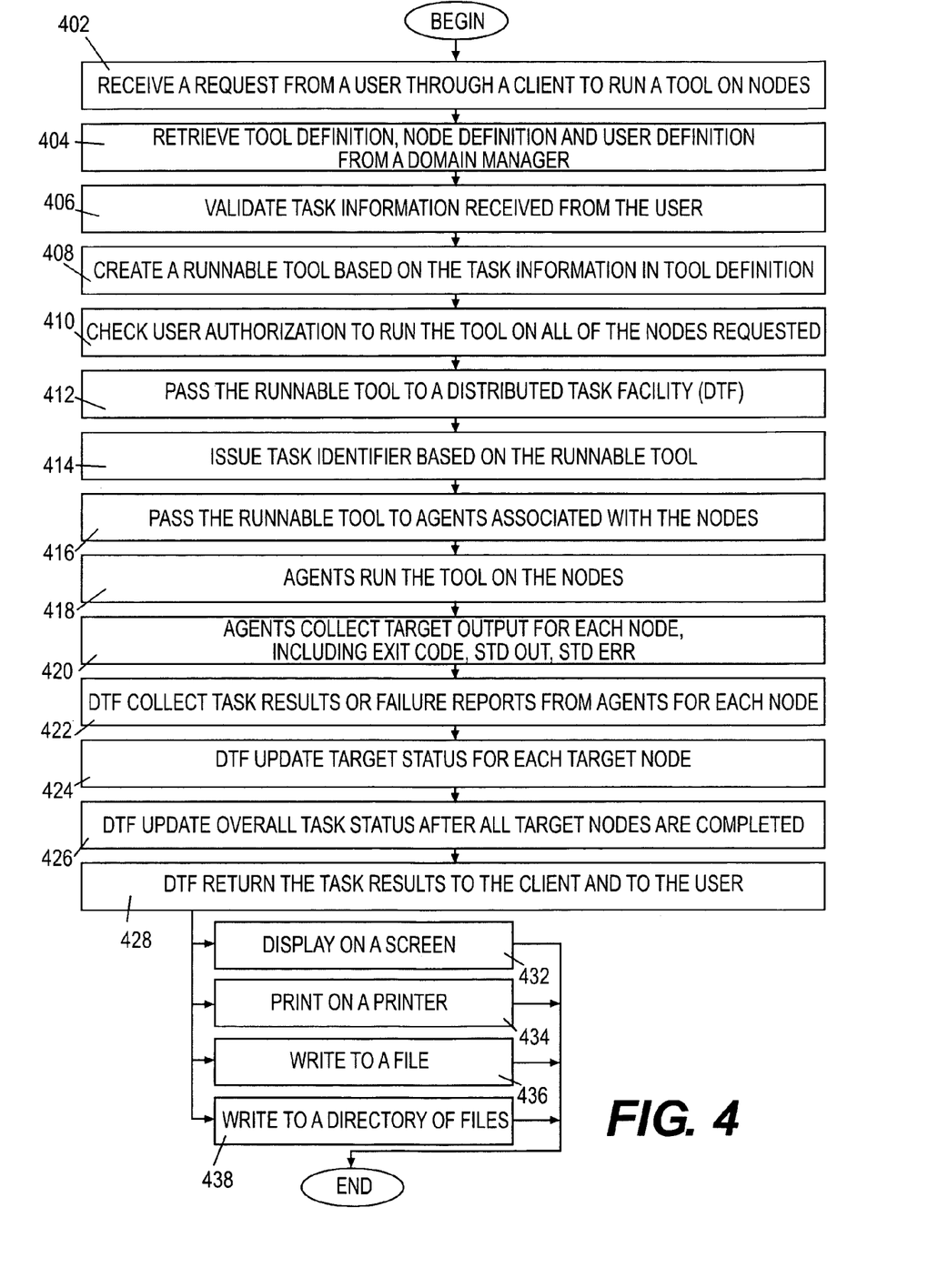
FIG. 4 is a flow chart of a method for executing tools in the SCM module.

FIG. 4 is a flow chart of a method for executing tools 240 on one or more managed nodes 130 in the SCM module 110

. This method may be implemented, for example, in software modules for execution by processor 108. first, the SCM module 110 may receive a request from a user 210 to run a tool on one or more nodes 130 through the client process, step 402, The request may include task information, such as the name of the tool to be run, the location of the tool, the nodes on which to run the tool, and required arguments of the tool, if any. Next, the SCM module 110 may retrieve tool definition, node definition and user definition from the domain manager 330, step 404, and validate the task information received from the user 210, step 406. The domain manager 330, connected to the repository 104, may be contacted to provide tool definition or information about the nodes 130 or the user 210 whenever the clients 310 need to look up a tool 240 or to verify nodes 130. An example of tool definition is described in Unites States patent application of Lister, Sanchez, Drees, and Finz, application Ser. No. 09/800,316, entitled "Service Control Manager Tool Definition," and filed on Mar. 6, 2001, which is incorporated herein by reference. The validation of the task information may include checking whether the nodes requested are the managed nodes, whether the tool actually exists, and whether the required arguments of the tool are given.

After the request is validated, the SCM module 110 may create a runnable tool object based on the task information and the tool definition, step 408. The runnable tool object may encapsulate the tool 240, the task information received from the user 210, and information that may be picked up from the environment, such as the user's name.

Then the SCM module 110 may need to check whether the user 210 is authorized to run the tool 240 on all of the nodes 130 requested, i.e., whether the user 210 is assigned one or more of the roles 220 associated with the tool 240 on all of the nodes 130. For example, if a user 210 requests to run a tool 240 on two nodes 130, and the user 210 is only authorized to run the tool on one node 130 but not the other, the SCM module 110 will not run the tool 240 on either node, due to the "all or none" authorization model. This user authorization checking may be done by a security manager 332, which may be a subsection of the domain manager 330, step 410.

Once the security manager 332 has made the determination that the user 210 is authorized to run the tool 240 on all of the nodes 130 requested, the security manager 332 may return the information back to the client 310, and the client 310 may pass the runnable tool to the DTF 340, step 412. The DTF 340 may then issue a task identifier based on the runnable tool, step 414, and passes the runnable tool to the agents 370 associated with the nodes 130 to run the tool 240 using POSIX standard interfaces, step 416. POSIX is an IEEE standard, and, as examples, the HP-UX program is compliant with POSIX. The processes that can be run on a POSIX compliant system may have access to a standard output that prints regular output, and a standard error output that prints error messages. A standard input is how a POSIX process would read input from a user or a file. The POSIX model masks input/output (I/O) operations and makes them look like file operations, reading input from a file on the file system and writing output to a file. Thus standard input, standard output and standard error are three standardized files, and when running a command or program in a POSIX compliant operating system, a user 210 may specify and control what is attached to those three files.

The task manager interface 350 may use running tool objects to perform the tasks, one per task. The DTF 340 may have a hash table that contains references to all the running tool objects that are active. The hash table is a common data structure for providing fast indexing of information by providing an algorithm that computes some type of address based on a hash key. The hash key for the hash table may be the task identifier, a string value generated by the DTF 340 based on the runnable tool that may be guaranteed to be unique.

When the running tool completes its task, the DTF 340 may create a completed task object to contain the final results, and dereference the running tool because the running tool is no longer needed. The completed task object may be a container of status objects. The DTF 340 may have a hash table that contains references to all the completed task objects, including the status information.

The status objects may include an overall task status object and individual target status objects. The overall task status object may include a task state indicator that reports whether the task is completed, failed or cancelled. The references to the runnable tool may be included so that a client that did not invoke the task may look up the definition of the task that was performed. The task state indicator may have one of the values as shown in Table 3:

TABLE 3

| Value of task state indicator | Meaning |
|---|---|
| MX_TASK_PENDING | The task does not have sufficient resources in the DTF yet to run and so it is waiting. No targets have been contacted. |
| MX_TASK_RUNNING | The task is now running. |
| MX_TASK_COMPLETE | The task is complete and it did not fail. |
| MX_TASK_FAILED | The task is complete and it failed before any target was contacted or on all targets. |
| MX_TASK_SOME_FAILURES | The task is complete and it failed on some targets while not failing on others. |
| MX_TASK_CANCELLED | The task was cancelled before it could complete on all specified targets. It might have failed on some targets and completed with no failures on others. |

The individual target status objects may report, for example, whether or not the connection to the node is completed, and whether the execution of the tool on the node is successful. The target status object may contain a target state indicator, a number of files copied count, a failure cause indicator, an exit code value, and a reference to a target output object. The target state indicator may take on the values as shown in Table 4:

TABLE 4

| Value of target state indicator | Meaning |
|---|---|
| MX_TARGET_PENDING | The target has not yet been contacted because resources are not available in the DTF to start it. |
| MX_TARGET_COPYING | The tool has files that need to be copied to the target and those files are currently being copied. |
| MX_TARGET_RUNNING | The command associated with the tool is now being executed on the target. |
| MX_TARGET_COMPLETE | The task has completed on the target and it did not fail. This is the only state in which the target status object contains a valid exit code value and a valid reference to a target output object that contains the resulting output from |

TABLE 4-continued

| Value of target state indicator | Meaning |
| --- | --- |
| | the execution of the command associated with the tool. |
| MX_TARGET_FAILED | The task has completed on the target and it failed. The failure cause indicator contains a value that indicates the cause of the failure. |
| MX_TARGET_CANCELLED | The task was cancelled on the target. The command associated with the tool was never executed. |
| MX_TARGET_KILLED | The command associated with the tool was running and was killed before it could complete. |

If the target state indicator is MX_TARGET_COMPLETE, the target status object may contain a valid value for the command exit code and a valid reference to a target output object, which may contain the exit code, standard output (stdout) and standard error output (stderr) that resulted from running the command associated with the tool 240 on the target node 130. The agent typically returns the exit code, instead of trying to interpret it, which may lead to conflicting results.

The status objects, the target output object and the runnable tool object are all serializable for transport to and from the DTF 340 via remote calls. Using remote calls to the DTF 340, the clients 310 may access these status and output objects and use them to display task and target status to the user 210.

After the DTF 340 passes the runnable tool to the agents 370 associated with the nodes 130, the agents 370 may execute the tool 240, step 418, and collect the target output, including the exit code, the stdout, and the stderr, step 420. Next, the DTF 260 may collect task results or failure reports from the agents 370 for each node 130, step 422, and update each individual target status, step 424.

After all target nodes have completed the execution, the DTF 260 may update the overall task status, step 426. The target liaisons 260 typically keep track of the individual target status by communicating with the agents 370 running on each of the target nodes 130. When all of the running tasks reach the final stage, whether completed, failed or cancelled, the DTF 260 may return the task results or failure reports to the clients 310 and then to the user 210, step 428. The user 210 may monitor and review the task results by displaying on a computer screen, step 432, printing on a printer, step 434, writing to a file, step 436, or writing to a directory of files that contains one file for each node 130 requested, step 438.

Tool execution may involve copying files and/or running commands and programs. If there are files to be copied from the CMS 100 to the nodes 130, the DTF 340 typically opens the files on the CMS 100 and reads the contents before contacting any of the multiple target nodes 130, so that errors maybe detected before the target nodes 130 are contacted. If the files cannot be read, the DTF 340 may start a failure process, and return a failure status to the user 210.

The DTF 340 may be multi-threaded in that it may accept multiple, simultaneous requests and may simultaneously perform multiple tasks on multiple managed nodes 130. There may be limits on the number of tasks that may be in process at one time and on the total number of node connections that may be active so as not to overwhelm the resources of the SCM module 110.

First, there may be a limit on the maximum number of simultaneous task executions that may be enforced by the DTF 340, in order to limit the resource consumption on the server. For example, if the limit is ten tasks at a time, and the DTF 340 tries to run the eleventh task when there are already ten tasks running, the eleventh task will wait until one of the ten finishes.

There may also be a limitation on the maximum number of nodes 130 with which the DTF 340 may communicate at a time for all of the tasks. For example, if the limit is sixteen, and a task needs to be run on sixty-five different nodes 130, then only sixteen nodes 130 will be contacted by the DTF 340, and the rest will wait until one or more of the sixteen complete the task, so that there will only be sixteen nodes 130 running at a time. The purpose is again for the control of memory resources so that the CMS 100 will not be overwhelmed by a large amount of requests at the same time.

Task execution is achieved through communication and interaction between the agents 370 and the target liaisons objects 260 on the CMS 100. The target liaison objects 360 may be created by the DTF 340 to keep track of the corresponding target nodes 130 and establish a one-on-one communication between the target liaisons 260 on the CMS 100 and the agents 370 running on the target nodes 130. To create the target liaison object 260, the DTF 340 may initialize the target liaison object 260 using the passed in arguments that include the task identifier, the hostname of the target with which it communicates, the number of files to be copied, and a reference to the running tool. Next, the DTF 340 may contact the agents 370 running on the target nodes 130 via the RMI registries on the nodes 130 (described later). The DTF 340 may pass the remote reference, the task definition, and a digital signature of the passed arguments to the agents 370 associated with the nodes 130. Then the execution of the task on the target nodes 130 is in the control of the agents 370 running on the nodes 130.

The SCM agents 370 may be the software component that are installed on all the managed nodes 130 in an SCM cluster that performs tasks on the nodes 130 on behalf of the DTF 340. The agents 370 typically communicate with the DTF via Java Remote Method Invocation (RMI) calls and register singleton objects with the Java RMI registries running on the nodes. Java RMI is a distributed object model for the Java Platform and extends the Java object model beyond a single virtual machine address space, so that executable code can be dynamically distributed on demand, including all necessary code for distributed applications. The term "Java" is a trademark of Sun Microsystems, Inc.

The execution of the task on the target nodes 130 may start with the agents 370 unpacking the task information and the tool definition encapsulated within the runnable tool. The agents 370 may be connected with the corresponding target liaison object 260 at the CMS 100, and therefore may report any changes, for example, a cancellation, quickly back to the DTF 340.

The agents 370 running on the managed nodes 130 may need to execute tasks with the minimum amount of invasion, i.e., use the least amount of resource, because the managed nodes may be web servers or database servers that have other important tasks. Therefore there may be a limit on the number of simultaneous tasks that can be performed by the agents 370. When a remote call is made to run a tool 240 on a target node 130, the agent 370 may check to see if there is a tool runner object in the free list. If there is, the agent 370 may remove the tool runner from the free list, initialize it, and then, using the task identifier as the key, add it to the active runner list. Next a thread may be created and passed to the tool runner. The task has now been launched with the tool runner doing most of the work. On the other hand, if there are no free tool runners, i.e., when the task capacity of the agent 370 is reached, any subsequent attempts to start new tasks on the agent 370 may result in an exception back to the DTF 340. The DTF 340 may attempt to run the task on any other pending target nodes 130 before retrying with the target node 130 that is at its limit. This may allow the task to continue on other nodes 130 that may be less loaded. If there are no other target nodes 130 on which to run the task, the DTF 340 may wait a small time, for example, a second, and retry starting the task again. This may continue until the target node 130 completes another task and accepts the new one or until the user 210 cancels the task. After the tool runner completes the task, the agent 370 may remove the tool runner from the active list and place it on the free list.

These limitations, i.e., task limit, node limit and agent limit, may all be customized by the user 210 depending upon the resources available.

An agent status object, parallel to the target status object, may be used to report the status of the task running on the individual nodes 130. The initial value of the agent status object may be MX_AGENT_TR_PENDING. After a call is made to run a tool 240 on the node 130, the agent 370 running on the node 130 may first check to see if the tool 240 specifies any files to be copied. If so, the tool runner may update the agent status value to MX_AGENT_TR_COPYING and then copy the files into place. Errors that result from copying files may result in a final agent status value of MX_AGENT_TR_FAILED or MX_AGENT_TR_CANCELLED and a failure may be reported.

If there are no files to copy, or after all such files have been copied, the runner may check the kill request flag to see if a kill task call has occurred in another thread. If so, the runner may update the agent status value to Mx_AGENT_TR_KILLED and report a failure. If not, the runner may update the agent status value to MX_AGENT_TR_RUNNING and continue. The tool runner may then run the commands associated with the tool 240 in a separate process and gather up the exit code, stdout and stderr.

An integral part of the SCM functionality may be the ability to record and maintain a history of events, by logging both SCM configuration changes and task execution events through the log manager 334. SCM configuration changes may include adding, modifying and deleting users and nodes in the SCM module 110, and creating, modifying and deleting node groups 132 and tools 240. Task execution events may include details and intermediate events associated with the running of a tool 240. The details may include the identity of the user 210 who launched the task, the task identifier, the task start time, the actual tool and command line with arguments, and the list of target nodes 130. The intermediate events may include the beginning of a task on a managed node 130, and exceptions that occur in attempting to run a tool 240 on a node 130, and the final result, if any, of the task. The exit code, stdout and stderr, if they exist, may also be logged.

While the present invention has been described in connection with an exemplary embodiment, it will be understood that many modifications will be readily apparent to those skilled in the art, and this application is intended to cover any variations thereof.

What is claimed is:

1. A computer implemented method for executing tools in a service control manager (SCM) module, the method comprising:

receiving, by the SCM module, a request from a user to run a tool on one or more nodes, wherein the request includes task information;

retrieving, by the SCM module, tool definition, node definition and user definition from a domain manager, wherein the tool definition specifies a role that contains the requested tool;

checking if the user is assigned with the role containing the requested tool, wherein the user is authorized to run the requested tool only if the user is assigned with the role containing the requested tool on all of the nodes;

creating a runnable tool by a client based on the task information and the tool definition;

passing the runnable tool from the client to a distributed task facility (DTF), wherein the DTF issues a task identifier based on the runnable tool; and passing the runnable tool from the DTF to agents associated with the nodes, wherein the agents are authorized users, and wherein the agents execute the runnable tool and return task results to the DTF.

2. The method of claim 1, further comprising validating the task information received from the user.

3. The method of claim 1, further comprising checking user authorization to run the tool on all of the nodes requested.

4. The method of claim 1, wherein the receiving step includes receiving the request through a client, wherein the client is a program that interacts with the user and displays information on computer systems that reside on the nodes.

5. The method of claim 4, wherein the receiving step includes receiving the request from a graphical user interface client.

6. The method of claim 4, wherein the receiving step includes receiving the request from a command line interface client for executing tasks.

7. The method of claim 1, further comprising:
collecting, by the SCM module, the task results from the agents; and
returning the task results to the user.

8. The method of claim 7, wherein the collecting step includes colleting failure reports from the agents.

9. The method of claim 7, wherein the collecting step includes updating individual target statuses.

10. The method of claim 7, wherein the collecting step includes collecting target outputs that contain an exit code, a standard output, or a standard error output that resulted from running commands associated with the tool on the nodes.

11. The method of claim 7, wherein the collecting step includes updating an overall task status.

12. The method of claim 7, wherein the returning step includes displaying the task results on a computer screen.

13. The method of claim 7, wherein the returning step includes printing the task results on a printer.

14. The method of claim 7, wherein the returning step includes writing the task results to a file or to a directory, wherein the directory contains one file for each node requested and the results for each node are written to the corresponding file in the directory.

15. A service control manager (SCM) module for execution of a tool, the SCM module comprising:

clients that are software programs interacting with users and displaying information on computer systems that reside on nodes that are managed servers in the SCM module;

a domain manager that manages and stores tool definitions, node definitions, role definitions, authorization definitions, and user definitions, wherein the tool definition specifies a role that contains the requested tool, wherein the SCM module checks if the user is assigned with the role containing the requested tool, wherein the user is authorized to run the requested tool only if the user is assigned with the role containing the requested tool on all of the nodes, and wherein the clients creates a runnable tool based on information returned from the domain manager;

a distributed task facility (DTF) that receives the runnable tool from the clients, and issues a task identifier based on the runnable tool; and agents associated with the nodes that receive the runnable tool from the DTF, and execute the tool on the nodes, wherein the agents are authorized users.

16. The SCM module of claim 15, wherein the DTF receives the runnable tool from the clients through task manager interfaces, wherein the task manager interfaces are called by the clients to perform a task, to cancel or kill a task, or to monitor task status operations.

17. The SCM module of claim 15, wherein the agents receive the runnable tool from the DTF through target liaison interfaces, wherein the target liaison interfaces are used by the agents to communicate with the DTF in order to process assigned tasks.

18. A computer implemented method for executing tools in a service control manager (SCM) module, the method comprising:

receiving, by the SCM module, a request from a user to run a tool on one or more nodes, wherein the request includes task information;

retrieving, by the SCM module, tool definition, node definition and user definition from a domain manager, wherein the tool definition specifies a role that contains the requested tool;

checking if the user is assigned with the role containing the requested tool, wherein the user is authorized to run the requested tool only if the user is assigned with the role containing the requested tool on all of the nodes;

creating a runnable tool by a client based on the task information and the tool definition provided by a domain manager;

passing the runnable tool from the client to a distributed task facility (DTF);

passing the runnable tool from the DTF to agents associated with the nodes, wherein the agents are authorized user;

running the tool on the nodes by the agents; and returning task results or failure reports to the DTF.

19. The method of claim 18, wherein the receiving step includes receiving the request through a client, wherein the client is a program that interacts with the user and displays information on computer systems that reside on the nodes.

20. The method of claim 18, wherein the returning step includes returning target outputs that contain an exit code, a standard output, or a standard error output that resulted from running the commands associated with the tool on the nodes.

* * * * *